United States Patent
Vertanen et al.

(10) Patent No.: US 9,184,691 B2
(45) Date of Patent: Nov. 10, 2015

(54) METHOD FOR CONTROLLING ELECTRIC DRIVE AND ELECTRIC DRIVE

(71) Applicant: ABB Oy, Helsinki (FI)

(72) Inventors: Mikko Vertanen, Espoo (FI); Markku Lyyjynen, Espoo (FI); Juha Suvanto, Vantaa (FI); Juha Saukko, Helsinki (FI)

(73) Assignee: ABB TECHNOLOGY OY, Helsinki (FI)

( * ) Notice: Subject to any disclaimer, the term of this patent is extended or adjusted under 35 U.S.C. 154(b) by 0 days.

(21) Appl. No.: 14/317,567

(22) Filed: Jun. 27, 2014

(65) Prior Publication Data

US 2015/0002060 A1    Jan. 1, 2015

(30) Foreign Application Priority Data

Jun. 27, 2013  (FI) ...................................... 20135705

(51) Int. Cl.
*H02P 27/04* (2006.01)
*H02P 27/06* (2006.01)

(52) U.S. Cl.
CPC ............ *H02P 27/06* (2013.01); *H02P 2205/03* (2013.01)

(58) Field of Classification Search
CPC .......... H02M 1/12; H02H 7/122; H02P 6/002
USPC ............. 318/400.01, 400.02, 400.14, 400.15, 318/400.07, 400.12, 700, 701, 721, 727, 318/729, 778, 779, 799, 800, 801, 807, 812, 318/254.1, 430, 432, 434, 437; 388/800, 388/814, 822; 363/40, 55, 71, 95, 109, 114, 363/135, 174, 175
See application file for complete search history.

(56) References Cited

U.S. PATENT DOCUMENTS

| | | | | |
|---|---|---|---|---|
| 4,450,398 A * | 5/1984 | Bose | ............................. | 318/803 |
| 7,957,166 B2 * | 6/2011 | Schnetzka et al. | .......... | 363/56.03 |
| 8,174,853 B2 * | 5/2012 | Kane et al. | ...................... | 363/40 |
| 8,981,686 B2 * | 3/2015 | Becerra et al. | ............ | 318/400.02 |
| 2013/0154530 A1 * | 6/2013 | Hargis | ..................... | 318/400.26 |

FOREIGN PATENT DOCUMENTS

FI           124495 B          9/2014

OTHER PUBLICATIONS

Finnish Search Report dated Mar. 10, 2014, by the Finnish Patent Office as the Searching Authority for Finnish Application No. 20135705.

(Continued)

*Primary Examiner* — Antony M Paul
(74) *Attorney, Agent, or Firm* — Buchanan Ingersoll & Rooney PC

(57) ABSTRACT

A method for controlling an electric drive, having an inverter, an electric motor and control means configured in a first operating state of the electric drive to control the electric drive to run in a constant operating point, determine and store a value of an output voltage of the inverter or a value of a flux reference of the inverter, and a value of a switching frequency of the inverter with which a determined input power of the electric drive is lowest. The controller is configured in a second operating state of the electric drive to control the electric drive to use the stored values to run in the operating point.

20 Claims, 1 Drawing Sheet

(56) References Cited

OTHER PUBLICATIONS

Durval de Almeida Souza et al., "Adaptive Fuzzy Controller for Efficiency Optimization of Induction Motors", IEEE Transactions on Industrial Electronics, vol. 54, No. 4, Aug. 2007, pp. 2157-2164.

Daniel S. Kirschen et al., "Optimal Efficiency Control of an Induction Motor Drive", IEEE Transactions on Energy Conversion, vol. EC-2, No. 1, Mar. 1987, pp. 70-76.

Couto, Carlos, "Control of a Voltage Source Inverter Fed Induction Motor with On-Line Efficiency Optimization," Proceedings of the IEEE International Conference on Industrial Technology, 1994, pp. 528-532.

Kioskeridis, Iordanis, "Loss Minimization in Scalar-Controlled Induction Motor Drives with Search Controllers," IEEE Transactions on Power Electronics, vol. 11, No. 2, Mar. 1996, pp. 213-220.

Choi, Jae-Young, "Effect of Switching Frequency of Soft Switched Inverter on Electric Vehicle System," IEEE Power Electronics in Transportation, 1998, pp. 63-69.

Sul, Seung, Ki, "A Novel Technique for Optimal Efficiency Control of a Current-Source Inverter-Fed Induction Motor," IEEE Transactions on Power Electronics, vol. 3, No. 2, Apr. 1988, pp. 192-199.

Berringer, Ken, "Semiconductor Power Losses in AC Inverters," IEEE Conference Record of the Industry Applications Conference, 1995, pp. 882-888.

Pyrhönen, Olli, "Analysis and Control of Excitation, Field Weakening and Stability in Direct Torque Controlled Electrically Excited Synchronous Motor Drives," Lappeenranta University of Technology, 1998.

Hofmann, Heath, "Optimal Efficiency Controller for Synchronous Reluctance Flywheel Drive," Twentieth International Telecommunications Energy Conference, 1998, Intelec, pp. 724-731.

Aarniovuori, Lassi, "Induction Motor Drive Energy Efficiency—Simulation and Analysis," Doctoral Thesis, Lappeenranta University of Technology, 2010, pp. 93-95.

Mohan et al., "Power Electronics, Converters, Applications, and Design," John Wiley & Sons, Inc., USA, 2003.

Vuorivirta, Antti, "Moottorimalliton skalaarisäätö," Lappeenrannan Teknillinen Korkeakoulu, Energiatekniikan Osasto, 2002.

Jun. 11, 2015 Finland Opposition issued in Finland Application No. 20135705.

* cited by examiner

METHOD FOR CONTROLLING ELECTRIC DRIVE AND ELECTRIC DRIVE

RELATED APPLICATIONS

This application claims priority under 35 U.S.C. §119 to Finnish Application No. 20135705 filed in Finland on Jun. 27, 2013, the entire content of which is hereby incorporated by reference in its entirety.

FIELD

The present disclosure relates to a method for controlling an electric drive, and an electric drive.

BACKGROUND INFORMATION

An inverter is an electrical device enabling generation of a voltage with a variable frequency. One example of an inverter is a converter bridge implemented by IGB transistors (IGBT, Insulated-gate Bipolar Transistor) or other power semiconductors. Inverters may be used in connection with motors for driving them with a variable frequency. An inverter may also be a part of a frequency converter used for driving a motor or another load, for example. A frequency converter can include two converters (i.e., a rectifier and an inverter), between which there is a direct-voltage or direct-current intermediate circuit. The rectifier and the inverter may also be positioned physically apart from each other, and one rectifier may feed several inverters via a common intermediate circuit or, alternatively, several rectifiers may feed one inverter. An example of a rectifier is a diode bridge or a thyristor bridge.

FIG. 1 shows an example of an electric drive having a frequency converter 40 and an electric motor 20 such as an asynchronous motor or a synchronous motor. The exemplary frequency converter 40 is composed of two converters, a rectifier 30 and an inverter 10, between which is provided a direct voltage intermediate circuit 50. The rectifier 30 obtains its supply from an alternating current (AC) source, which is for instance a 50- or 60-Hz alternating current network. As illustrated in the example of FIG. 1, the supply from the output of the inverter 10 to the motor 20 may be a three-phase alternating current connection, for example.

The efficiency of an electric drive can depend on several variables such as an output voltage of the inverter or a flux of the motor and a switching frequency of the inverter. Moreover, the operating point in which the electric drive is running can also effect optimal values of these variables. As a result, the operating parameters of the inverter of the electric drive should be accommodated to the properties of the motor of the electric drive such that the electric drive can be operated as efficiently as possible. This could be done by numerical computing using known motor parameters.

However, the motor parameters may not always be known accurately enough in order to determine optimal operating parameters for the electric drive.

SUMMARY

A method is disclosed for controlling an electric drive having an inverter and an electric motor supplied by the inverter, wherein during a first operating state of the electric drive the method comprises: a) running the electric drive in a desired operating point; b) determining an input power of the electric drive; c) determining a value of an output voltage of the inverter or a value of a flux reference of the inverter with which the determined input power of the electric drive is lowest by varying the value of the output voltage of the inverter or the value of the flux reference of the inverter; d) determining a value of a switching frequency of the inverter with which the determined input power of the electric drive is lowest by varying the value of the switching frequency of the inverter; and e) storing the operating point together with the determined value of the output voltage of the inverter or the determined value of the flux reference of the inverter and the determined value of the switching frequency of the inverter; and wherein during a second operating state of the electric drive the method comprises: using the stored value of the output voltage of the inverter or the stored value of the flux reference of the inverter and the stored value of the switching frequency of the inverter whenever running the electric drive in the operating point stored together with said values is disclosed.

An electric drive is also disclosed comprising: an inverter; an electric motor supplied by the inverter; and control means for controlling the electric drive, the control means being configured in a first operating state of the electric drive to: control the electric drive to run in a desired operating point; determine a value of an output voltage of the inverter or a value of a flux reference of the inverter with which a determined input power of the electric drive is lowest by varying the value of the output voltage of the inverter or the value of the flux reference of the inverter; determine a value of a switching frequency of the inverter with which the determined input power of the electric drive is lowest by varying the value of the switching frequency of the inverter; and store the operating point together with the determined value of the output voltage of the inverter or the determined value of the flux reference of the inverter and the determined value of the switching frequency of the inverter; and wherein the control means is configured in a second operating state of the electric drive to: control the electric drive to use the stored value of the output voltage of the inverter or the stored value of the flux reference of the inverter and the stored value of the switching frequency of the inverter whenever controlling the electric drive to run in the operating point stored together with said values is disclosed.

An electric drive is also disclosed comprising: an inverter; an electric motor; and a control arrangement for controlling the electric drive, the control arrangement having a processor and a non-transitory memory storing instructions that, when executed by the processor, will cause the control arrangement in a first operating state of the electric drive to: control the electric drive to run in a desired operating point; determine a value of an output voltage of the inverter or a value of a flux reference of the inverter with which a determined input power of the electric drive is lowest by varying the value of the output voltage of the inverter or the value of the flux reference of the inverter; determine a value of a switching frequency of the inverter with which the determined input power of the electric drive is lowest by varying the value of the switching frequency of the inverter; and store the operating point together with the determined value of the output voltage of the inverter or the determined value of the flux reference of the inverter and the determined value of the switching frequency of the inverter; and which will cause the control arrangement in a second operating state of the electric drive to: control the electric drive via the stored value of the output voltage of the inverter or the stored value of the flux reference of the inverter and the stored value of the switching frequency of the inverter whenever controlling the electric drive to run in the operating point stored together with said values is disclosed.

BRIEF DESCRIPTION OF THE DRAWINGS

Features disclosed herein will now be explained in greater detail in connection with preferred exemplary embodiments and with reference to the attached drawings, in which.

DETAILED DESCRIPTION

A method, and an apparatus for implementing the method (e.g., a computer program product, or an electric drive) are disclosed so as to solve or at least alleviate the issues already disclosed.

Exemplary embodiments can include running an electric drive in a constant operating point and determining a value of an output voltage of the inverter or a value of a flux reference of the inverter and a value of a switching frequency of the inverter with which a determined input power of the electric drive is lowest. The determined values of the output voltage or the flux reference of the inverter and the switching frequency of the inverter can be used whenever running the electric drive in the same operating point again.

According to exemplary embodiments, optimal operating parameters for the inverter of the electric drive can be obtained in a simple manner even without knowing the motor parameters.

Exemplary embodiments disclosed herein are not restricted to any specific system, but may be applied to various electric systems. In addition, exemplary embodiments disclosed herein are not restricted to any system utilizing a specific basic frequency or to any specific voltage level.

Figure 1:
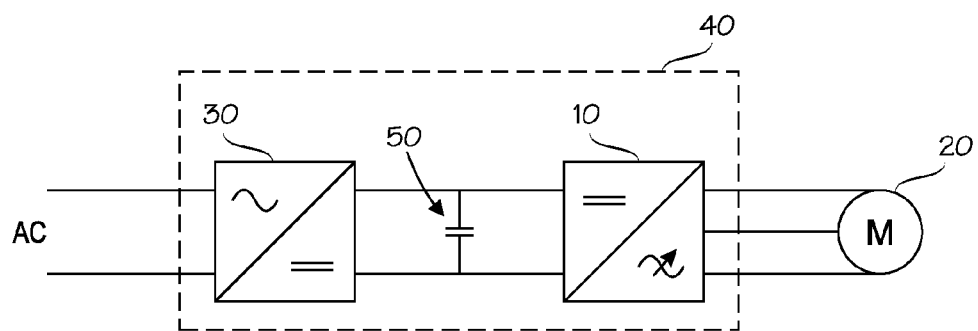
FIG. 1 shows a diagram of an electric drive according to an exemplary embodiment.
Figure 2:
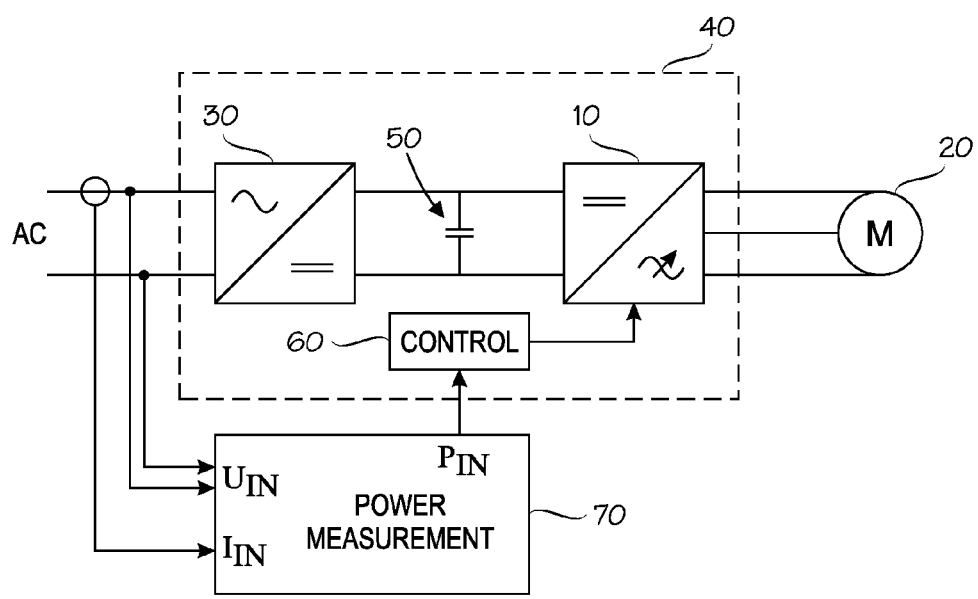
FIG. 2 shows a diagram of an electric drive according to an exemplary embodiment.

FIG. 2 shows an exemplary embodiment of an electric drive according to the present disclosure. It should be noted that the figure only presents elements essential to the understanding features disclosed herein. The exemplary electric drive includes a frequency converter 40 and an electric motor 20 such as an asynchronous motor or a synchronous motor. The electric drive could also include an inverter and a motor, for example.

The exemplary frequency converter 40 can be composed of two converters, a rectifier 30 and an inverter 10, between which is provided a direct voltage intermediate circuit 50. The rectifier 30 obtains its supply from an alternating current (AC) source, which is for instance a 50- or 60-Hz alternating current network. As illustrated in the example of FIG. 2, the supply from the output of the inverter 10 to the motor 20 may be a three-phase alternating current connection, for example.

The exemplary frequency converter 40 can further include a control arrangement 60 which controls the operation of the frequency converter. The control arrangement 60 may control the operation of the inverter 10, for example. The control arrangement 60 may perform the normal modulation control of the inverter 10 according to the modulation scheme used, for example. The control arrangement 60 may perform measurements of or receive input signals regarding various motor quantities in order to perform the control of the frequency converter 40. Such quantities may include, for example, motor current and motor shaft speed. Possible measuring arrangements for such quantities are not shown in the figure for the sake of clarity. The inverter 10 may be operated in scalar control mode, in vector control mode or in direct torque control mode, for example.

According to an exemplary embodiment, the following (a) to (e) are performed during a first operating state of the electric drive:

(a) The electric drive is run in a constant (e.g., constant or substantially constant (e.g., ±10%)) operating point. This may be performed by the control arrangement 60. According to an exemplary embodiment, in a constant operating point, a load torque of the electric motor 20, a shaft speed of the electric motor 20 and a temperature of the electric motor 20 are constant.

(b) An input power of the electric drive is determined. The control arrangement 60 may measure the input power of the electric drive, or a separate measuring arrangement 70 may be used. As shown in FIG. 2, the optional measuring arrangement 70 measures an input voltage $U_{IN}$ and an input current $I_{IN}$ of the electric drive and calculates the input power $P_{IN}$ of the electric drive. The calculated input power $P_{IN}$ of the electric drive may then be provided to the control arrangement 60 from the measuring arrangement 70. The determination of the input power of the electric drive may be essentially continuous or may take place only when the input power of the electric drive is desired to be known, for example. A possible separate measuring arrangement 70 may be connected to the electric drive only when input power measurements are to be performed or the possible separate measuring arrangement 70 may be continuously connected to the electric drive, for example.

(c) A value of the output voltage of the inverter 10 or a value of the flux reference of the inverter 10 can be varied, and a value of an output voltage of the inverter or a value of a flux reference of the inverter with which the determined input power of the electric drive is the lowest can be determined. Whether a value of an output voltage of the inverter or a value of a flux reference of the inverter is varied and determined may depend on which control mode the inverter is operated in, for example. This may be performed by the control arrangement 60 and may be performed such that the value of the output voltage of the inverter or the value of the flux reference of the inverter is set to two or more different values, and then the set value of the output voltage of the inverter or the set value of the flux reference of the inverter with which the determined input power of the electric drive is the lowest can be selected as the determined value. The more different values of the output voltage of the inverter or of the flux reference of the inverter are tested, the more accurately a value of the output voltage of the inverter or the value of the flux reference of the inverter with which the determined input power of the electric drive is the lowest can be determined.

Alternatively, it is possible to gradually vary the value of the output voltage of the inverter or the value of the flux reference of the inverter, and determine the value of the output voltage of the inverter or the value of the flux reference of the inverter with which the determined input power of the electric drive is the lowest on the basis of a derivative of the determined input power of the electric drive. In other words, when the derivative of the determined input power of the electric drive reaches or passes zero, it indicates that a minimum input power point is reached, whereby a corresponding value of the output voltage of the inverter or the value of the flux reference of the inverter may be selected as the determined value.

(d) A value of the switching frequency of the inverter 10 can be varied, and a value of a switching frequency of the inverter with which the determined input power of the electric drive is the lowest can be determined. This may be performed by the control arrangement 60 and may be performed such that the value of the switching frequency of the inverter is set to two or more different values, and then selecting the set value of the switching frequency of the inverter with which the determined input power of the electric drive is the lowest as the determined value. The more different values of the switching frequency of the inverter are tested, the more accurately the value of the switching frequency of the inverter with which the determined input power of the electric drive is the lowest can be determined.

Alternatively, it is possible to gradually vary the value of the switching frequency of the inverter and determine the value of the switching frequency of the inverter with which the determined input power of the electric drive is the lowest on the basis of the derivative of the determined input power of the electric drive. In other words, when the derivative of the determined input power of the electric drive reaches or passes zero, it indicates that a minimum input power point is reached, whereby a corresponding value of the switching frequency of the inverter may be selected as the determined value.

(e) The operating point can be stored together with the determined value of the output voltage of the inverter or the determined value of the flux reference of the inverter, and the determined value of the switching frequency of the inverter. This may be performed by the control arrangement 60. The information may be stored in a table format, such as a lookup table, such that the information can be easily retrieved and used later.

According to an exemplary embodiment, phases (a) to (e) above can be repeated for two or more different operating points. For example, the electric drive can be run in all the desired or expected operating points and the corresponding values for the output voltage of the inverter or for the flux reference of the inverter, and for the switching frequency of the inverter with which the determined input power of the electric drive is the lowest can be determined. If such desired or expected operating points are not known for the electric drive in question, then phases a) to e) above can be repeated for a number of operating points that are selected according to any other desired criteria. For example, a sufficient number of evenly spaced operating points covering a possible operating range of the electric drive may be examined.

According to an exemplary embodiment, during a second operating state of the electric drive, the stored value of the output voltage of the inverter or the stored value of the flux reference of the inverter, and the stored value of the switching frequency of the inverter can be used, whenever running the electric drive in the operating point stored together with the values. This may be performed by the control arrangement 60. In other words, the control arrangement 60 may use the stored values for controlling the inverter 10 when the electric drive is later run in an operating point that has been examined during the first operating state of the electric drive and for which operating point corresponding values for the output voltage of the inverter or for the flux reference of the inverter, and for the switching frequency of the inverter with which the determined input power of the electric drive is the lowest, have been determined and stored. Accordingly, the control arrangement 60 may control the output voltage of the inverter to match the stored value for the output voltage of the inverter or the flux reference of the inverter to match the stored value for the flux reference of the inverter, and the switching frequency of the inverter to match the stored value for the switching frequency of the inverter.

The electric drive can switch between the first operating state and the second operating state whenever necessary or desired. For example, the electric drive can first be in the first operating state, during which one or more operating points are examined and then switch to the second operating state, during which the stored information may be utilized, when running the electric drive. After operating in the second operating state the electric drive can again switch back to the first operating state during which one or more further operating points are examined.

It is also possible to re-examine one or more operating points and redetermine the values for the output voltage of the inverter or for the flux reference of the inverter, and for the switching frequency of the inverter with which the determined input power of the electric drive is the lowest. After that, the electric drive can switch back to the second operating state again and so on. It is also possible to switch the electric drive to the first operating state whenever the electric drive is running in an operating point for which there are no stored values of the output voltage of the inverter or the flux reference of the inverter, and the switching frequency of the inverter. This way the electric drive can learn optimum operating parameters even during normal operation of the drive.

The control of the electric drive according to the various embodiments described herein can be performed by or via the control arrangement 60, which can also perform the normal modulation control of the switches of the inverter, for example. It is also possible to use additional or separate logical or physical units for performing the control functionality of the invention. The functionality disclosed herein could, for example, be implemented using a separate arrangement, which could be independent of the normal modulation control of the switches, for example.

The control arrangement 60 controlling the electric drive according to any of the embodiments described herein, or a combination thereof, can be implemented as one unit or as two or more separate units that are configured to implement the functionality of the various embodiments. Here the term 'unit' refers, for example, generally to a physical or logical entity, such as a physical device or a part thereof or a software routine. The control arrangement 60 according to the disclosed embodiments may be implemented at least partly by means of one or more computers or corresponding digital signal processing (DSP) equipment provided with suitable software, for example. Such a computer or digital signal processing equipment can include at least a working memory (RAM) providing storage area for arithmetical operations, and a central processing unit (CPU), such as a general-purpose digital signal processor. The CPU may include a set of registers, an arithmetic logic unit, and a CPU control unit.

The CPU control unit can be controlled by a sequence of program instructions transferred to the CPU from the RAM. The CPU control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The computer may also have an operating system which may provide system services to a computer program written with the program instructions. The computer or other apparatus for implementing the features disclosed herein, or a part thereof, may include suitable input means for receiving data (e.g., measurement and/or control data), and output means for outputting data (e.g., control data). It is also possible to use analog circuits, programmable logic devices (PLD) or discrete electric components and devices for implementing any or all of the functionality according to any embodiments disclosed herein. For example, the control arrangement 60 according to embodiments disclosed herein may be implemented at least partly by means of such analog circuits or programmable logic devices.

Features disclosed herein can be implemented in existing system elements or by using separate dedicated elements or devices in a centralized or distributed manner. Present inverters or frequency converters, for example, can include programmable logic devices or processors and memory that can be utilized in the functions according to exemplary embodiments as disclosed. Thus, all modifications and configurations for implementing exemplary embodiments (e.g., in existing inverters or frequency converters) may be performed as software routines, which may be implemented as added or updated software routines.

If at least part of the functionality disclosed herein is implemented by software, such software can be provided as a non-transitory computer program product having stored computer program code which, when run on a computer, will cause the computer or a corresponding arrangement to perform the functionality as described herein. Such a computer program code may be stored or generally embodied on a non-transitory computer readable medium, such as a suitable memory (e.g., a flash memory or an optical memory), from which it is loadable to the unit or units executing the program code. In addition, such a computer program code implementing the exemplary embodiments may be loaded to the unit or units executing the computer program code via a suitable data network, for example, and it may replace or update a possibly existing program code.

It will be apparent to those skilled in the art that, as technology advances, the basic ideas disclosed herein may be implemented in various ways. Embodiments are thus not restricted to the examples disclosed herein but may vary within the scope of the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method for controlling an electric drive having an inverter and an electric motor supplied by the inverter, wherein during a first operating state of the electric drive the method comprises:
   a) running the electric drive in a desired operating point;
   b) determining an input power of the electric drive;
   c) determining a value of an output voltage of the inverter or a value of a flux reference of the inverter with which the determined input power of the electric drive is lowest by varying the value of the output voltage of the inverter or the value of the flux reference of the inverter;
   d) determining a value of a switching frequency of the inverter with which the determined input power of the electric drive is lowest by varying the value of the switching frequency of the inverter; and
   e) storing the operating point together with the determined value of the output voltage of the inverter or the determined value of the flux reference of the inverter and the determined value of the switching frequency of the inverter; and
   wherein during a second operating state of the electric drive the method comprises:
   using the stored value of the output voltage of the inverter or the stored value of the flux reference of the inverter and the stored value of the switching frequency of the inverter whenever running the electric drive in the operating point stored together with said values.

2. The method of claim 1, wherein steps a) to e) are repeated for two or more different operating points.

3. The method of claim 2, wherein in a desired operating point, a load torque of the electric motor, a shaft speed of the electric motor, and a temperature of the electric motor are substantially constant.

4. The method of claim 3, wherein step c) comprises:
setting the value of the output voltage of the inverter or the value of the flux reference of the inverter to at least two different values, and selecting a set value of the output voltage of the inverter or a set value of the flux reference of the inverter with which the determined input power of the electric drive is lowest as the determined value; and wherein step d) comprises:
setting the value of the switching frequency of the inverter to at least two different values, and selecting a set value of the switching frequency of the inverter with which the determined input power of the electric drive is lowest as the determined value.

5. The method of claim 3, wherein step c) comprises:
varying gradually the value of the output voltage of the inverter or the value of the flux reference of the inverter; and determining the value of the output voltage of the inverter or the value of the flux reference of the inverter with which the determined input power of the electric drive is lowest based on a derivative of the determined input power of the electric drive; and wherein step d) comprises:
varying gradually the value of the switching frequency of the inverter; and determining the value of the switching frequency of the inverter with which the determined input power of the electric drive is the lowest based on the derivative of the determined input power of the electric drive.

6. The method of claim 3, comprising:
operating the inverter in scalar control mode, in vector control mode or in direct torque control mode.

7. The method of claim 1, wherein in a desired operating point, a load torque of the electric motor, a shaft speed of the electric motor, and a temperature of the electric motor are substantially constant.

8. The method of claim 1, wherein step c) comprises:
setting the value of the output voltage of the inverter or the value of the flux reference of the inverter to at least two different values, and selecting a set value of the output voltage of the inverter or a set value of the flux reference of the inverter with which the determined input power of the electric drive is lowest as the determined value; and wherein step d) comprises:
setting the value of the switching frequency of the inverter to at least two different values, and selecting a set value of the switching frequency of the inverter with which the determined input power of the electric drive is lowest as the determined value.

9. The method of claim 1, wherein step c) comprises:
varying gradually the value of the output voltage of the inverter or the value of the flux reference of the inverter; and determining the value of the output voltage of the inverter or the value of the flux reference of the inverter with which the determined input power of the electric drive is lowest based on a derivative of the determined input power of the electric drive; and wherein step d) comprises:
varying gradually the value of the switching frequency of the inverter; and determining the value of the switching frequency of the inverter with which the determined input power of the electric drive is the lowest based on the derivative of the determined input power of the electric drive.

10. The method of claim 1, comprising:
operating the inverter in scalar control mode, in vector control mode or in direct torque control mode.

11. The method of claim 1, wherein the electric motor is an asynchronous motor or a synchronous motor.

12. A computer program product comprising computer program code embodied on a non-transitory computer readable medium, wherein execution of the program code on a computer will cause the computer to carry out the steps of the method according to claim 1.

13. An electric drive comprising:
an inverter;
an electric motor supplied by the inverter; and
control means for controlling the electric drive, the control means being configured in a first operating state of the electric drive to:
control the electric drive to run in a desired operating point;
determine a value of an output voltage of the inverter or a value of a flux reference of the inverter with which a determined input power of the electric drive is lowest by varying the value of the output voltage of the inverter or the value of the flux reference of the inverter;
determine a value of a switching frequency of the inverter with which the determined input power of the electric drive is lowest by varying the value of the switching frequency of the inverter; and
store the operating point together with the determined value of the output voltage of the inverter or the determined value of the flux reference of the inverter and the determined value of the switching frequency of the inverter; and wherein the control means is configured in a second operating state of the electric drive to:
control the electric drive to use the stored value of the output voltage of the inverter or the stored value of the flux reference of the inverter and the stored value of the switching frequency of the inverter whenever controlling the electric drive to run in the operating point stored together with said values.

14. The electric drive of claim 13, wherein the control means is configured in the first operating state of the electric drive to:
control the electric drive to run in two or more different substantially constant operating points;
perform, for each of the two or more operating points, the determination of the values of the output voltage of the inverter or the flux reference of the inverter and the switching frequency of the inverter with which the determined input power of the electric drive is lowest; and
store each of the two or more operating points together with the corresponding determined values of the output voltage of the inverter or the flux reference of the inverter and the switching frequency of the inverter.

15. The electric drive of claim 13, wherein in a desired operating point, a load torque of the electric motor, a shaft speed of the electric motor and a temperature of the electric motor are substantially constant.

16. The electric drive of claim 13, wherein the control means are configured to:
determine the value of the output voltage of the inverter or the value of the flux reference of the inverter by setting the value of the output voltage of the inverter or the value of the flux reference of the inverter to at least two different values, and by selecting a set value of the output voltage of the inverter or a set value of the flux reference of the inverter with which the determined input power of the electric drive is lowest as the determined value; and
determine the value of the switching frequency of the inverter by setting the value of the switching frequency of the inverter to at least two different values, and by selecting a set value of the switching frequency of the inverter with which the determined input power of the electric drive is the lowest as the determined value.

17. The electric drive of claim 13, wherein the control means are configured to:
determine the value of the output voltage of the inverter or the value of the flux reference of the inverter by varying gradually the value of the output voltage of the inverter or the value of the flux reference of the inverter; and by determining the value of the output voltage of the inverter or the value of the flux reference of the inverter with which the determined input power of the electric drive is lowest based on a derivative of the determined input power of the electric drive; and
determine the value of the switching frequency of the inverter by varying gradually the value of the switching frequency of the inverter; and by determining the value of the switching frequency of the inverter with which the determined input power of the electric drive is lowest based on the derivative of the determined input power of the electric drive.

18. The electric drive of claim 13, wherein the inverter is configured to operate in scalar control mode, in vector control mode or in direct torque control mode.

19. The electric drive of claim 13, wherein the electric motor is an asynchronous motor or a synchronous motor.

20. An electric drive comprising:
an inverter;
an electric motor; and
a control arrangement for controlling the electric drive, the control arrangement having a processor and a non-transitory memory storing instructions that, when executed by the processor, will cause the control arrangement in a first operating state of the electric drive to:
control the electric drive to run in a desired operating point;
determine a value of an output voltage of the inverter or a value of a flux reference of the inverter with which a determined input power of the electric drive is lowest by varying the value of the output voltage of the inverter or the value of the flux reference of the inverter;
determine a value of a switching frequency of the inverter with which the determined input power of the electric drive is lowest by varying the value of the switching frequency of the inverter; and
store the operating point together with the determined value of the output voltage of the inverter or the determined value of the flux reference of the inverter and the determined value of the switching frequency of the inverter; and which will cause the control arrangement in a second operating state of the electric drive to:
control the electric drive via the stored value of the output voltage of the inverter or the stored value of the flux reference of the inverter and the stored value of the switching frequency of the inverter whenever controlling the electric drive to run in the operating point stored together with said values.

* * * * *